No. 875,297. PATENTED DEC. 31, 1907.
G. W. STANLEY.
GASOLENE ENGINE.
APPLICATION FILED AUG. 20, 1906.
3 SHEETS—SHEET 1.
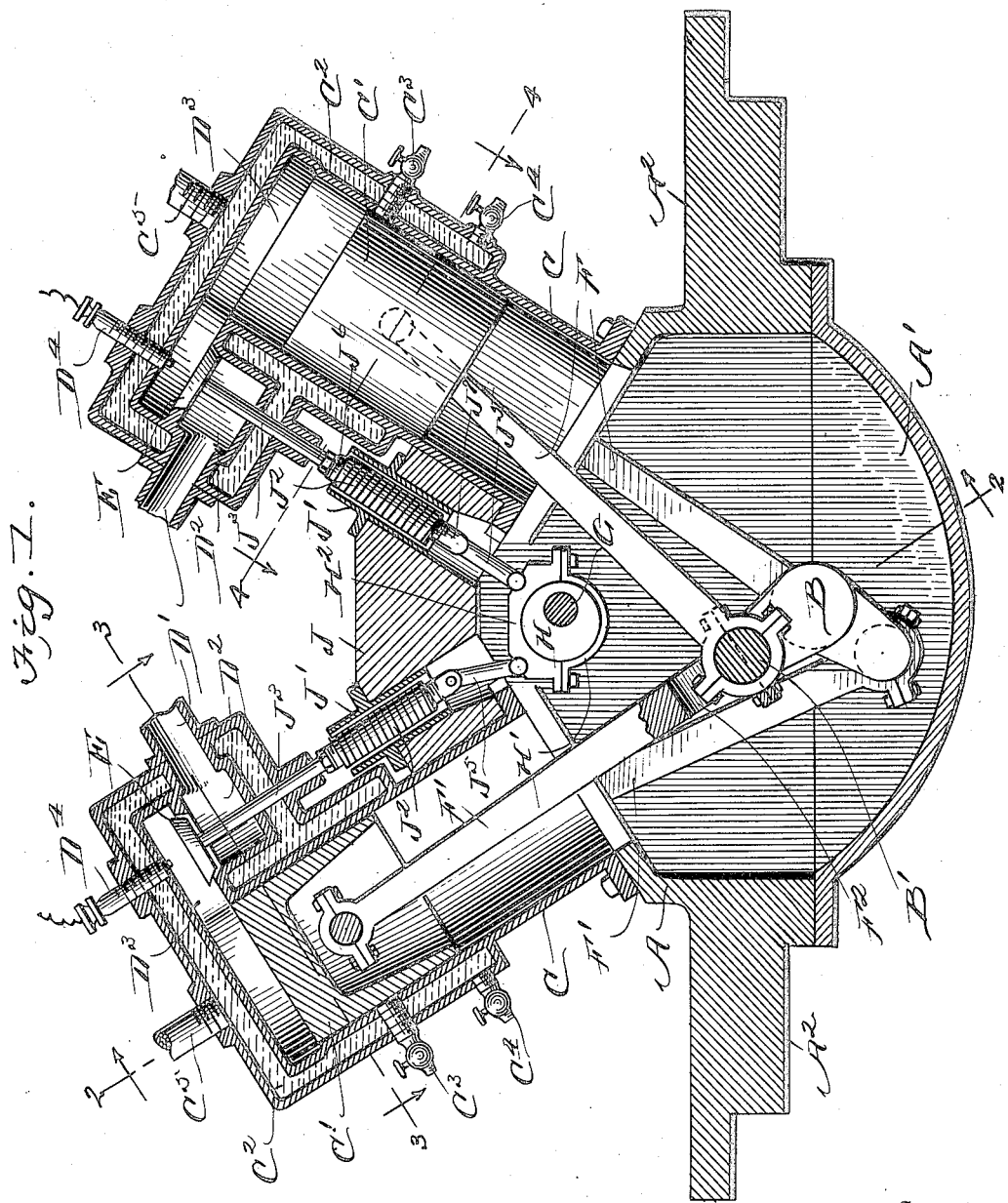
Witnesses
Inventor
G. W. Stanley.
By O'Meara & Brock
Attorneys No. 875,297. PATENTED DEC. 31, 1907.
G. W. STANLEY.
GASOLENE ENGINE.
APPLICATION FILED AUG. 20, 1906.

3 SHEETS—SHEET 2.

Witnesses

Inventor
G. W. Stanley
By
Attorneys

No. 875,297. PATENTED DEC. 31, 1907.
G. W. STANLEY.
GASOLENE ENGINE.
APPLICATION FILED AUG. 20, 1906.
3 SHEETS—SHEET 3.
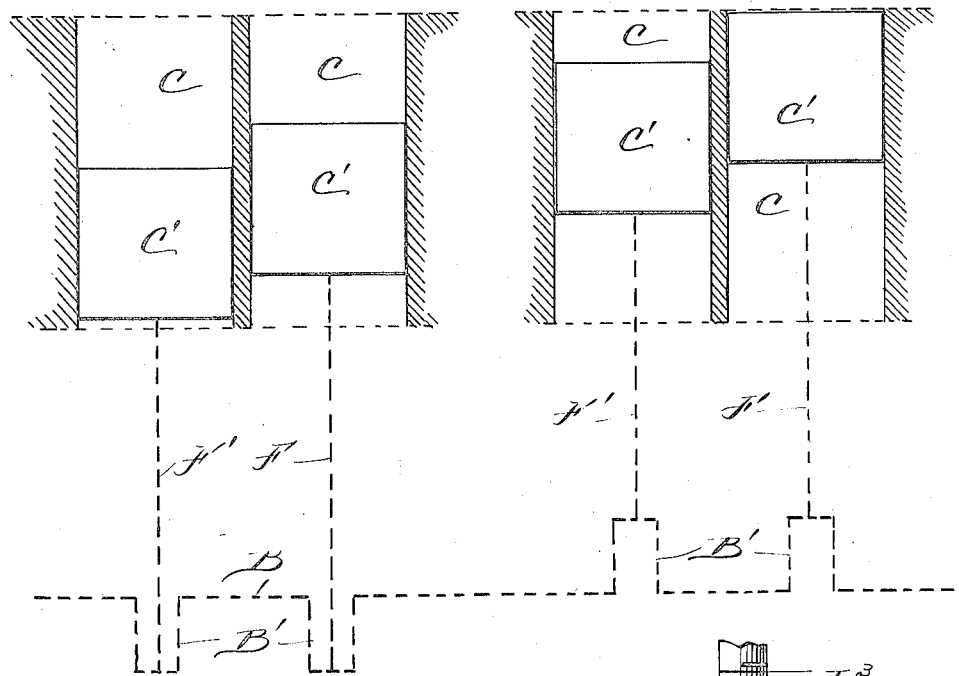
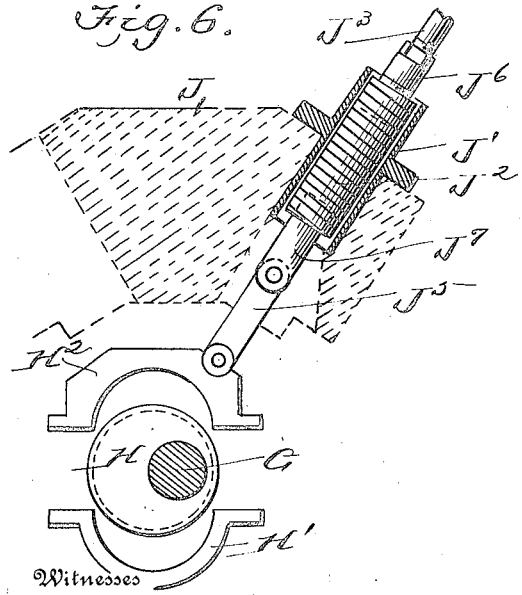
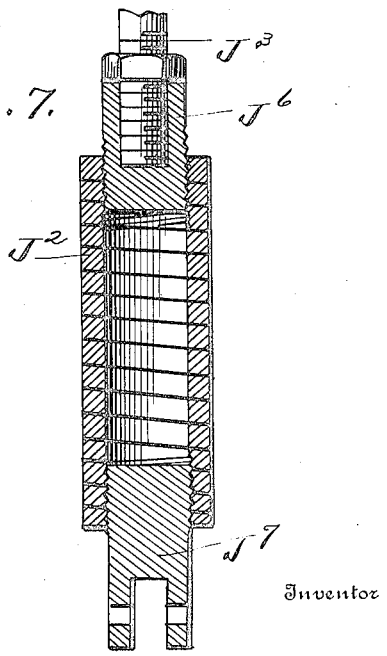
Witnesses
Inventor
G. W. Stanley.
By
Attorneys

UNITED STATES PATENT OFFICE.

GEORGE W. STANLEY, OF LOGANSPORT, INDIANA, ASSIGNOR OF ONE-EIGHTH TO GEORGE D. MILLER, ONE-EIGHTH TO ERNEST A. TUCKER, ONE-EIGHTH TO ARTHUR E. STANLEY, ONE-EIGHTH TO FREDERICK H. KLINSICK, AND ONE-EIGHTH TO WILLIAM D. CRAIG, OF LOGANSPORT, INDIANA.

GASOLENE-ENGINE.

No. 875,297.   Specification of Letters Patent.   Patented Dec. 31, 1907.

Application filed August 20, 1906. Serial No. 331,352.

*To all whom it may concern:*

Be it known that I, GEORGE W. STANLEY, a citizen of the United States, residing at Logansport, in the county of Cass and State of Indiana, have invented a new and useful Improvement in a Gasolene-Engine, of which the following is a specification.

This invention relates to gasolene engines and has for its object an engine of this type in which an increased amount of power may be obtained without a proportionate increase in size, weight, and cost of the engine, and a further object of the invention is to reduce the amount of friction to a minimum by reducing the number of bearings and to also obtain a very light and compact engine. In engines of this kind it is common to have on a four cylinder engine, nine bearings and on a six cylinder engine, thirteen bearings. I have reduced this number to five and seven respectively, and this not only reduces the amount of friction but also enables me to shorten the length of the casings and of the drive shaft and thereby obtain a very light engine for the number of cylinders used.

Figures 3, 4:
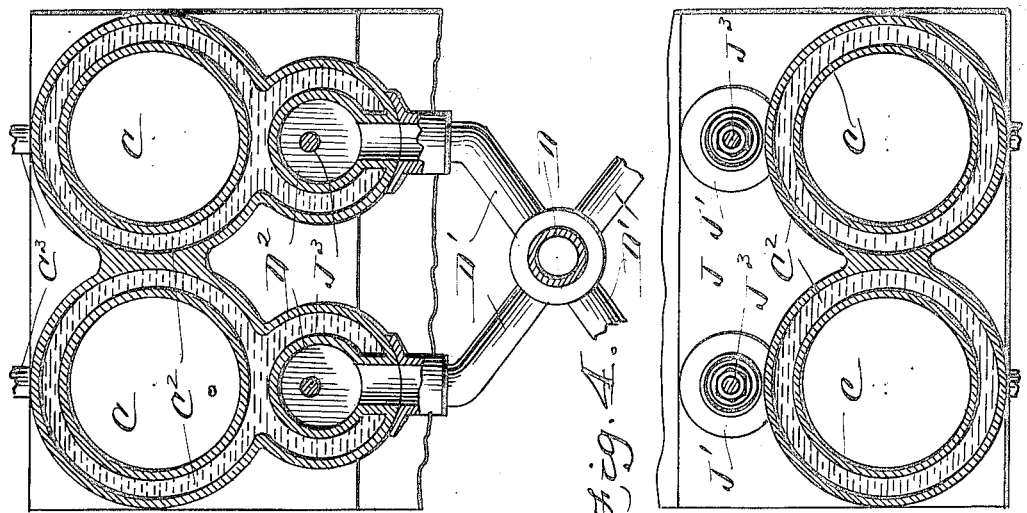
Figure 2:
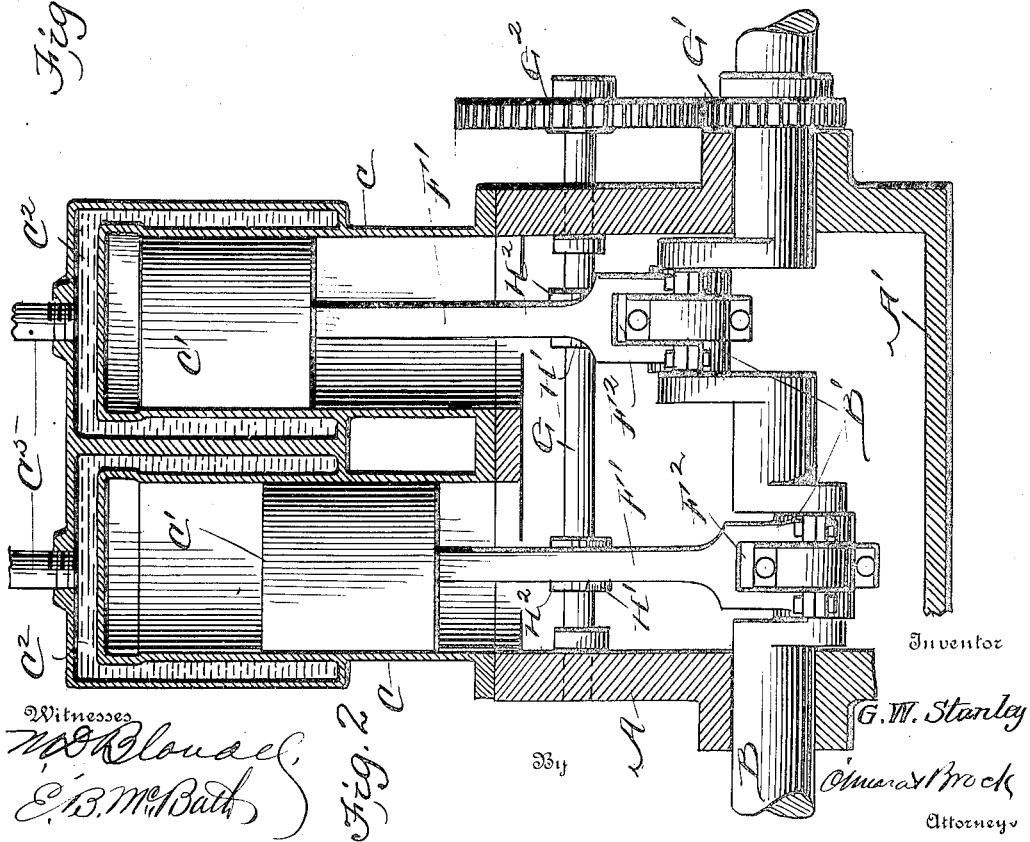

The invention consists of the novel features of construction, hereinafter fully described, pointed out in the claims and shown in the accompanying drawings, in which, Figure 1 is a vertical sectional view taken longitudinally through one set of oppositely disposed cylinders, and transverse through the casing and one wrist pin. Fig. 2 is a section on the line 2—2 of Fig. 1. Fig. 3 is a section on the line 3—3 of Fig. 1. Fig. 4 is a section on the line 4—4 of Fig. 1. Fig. 5 is a diagrammatic view illustrating the relative positions of the pistons in the respective cylinders, and the relative angle of the crank portions of the driving shaft. Fig. 6 is a detail sectional view through a small portion of the casing and through a guide sleeve illustrating the construction of a valve moving mechanism parts being detached. Fig. 7 is a longitudinal section through a coil spring and attached parts, the parts being shown in elevation in Fig. 6.

In these drawings I have illustrated my invention as applied to a four cylinder engine, although it will be understood that it can be applied to any multiple of a two cylinder engine which may be desired by the addition of the extra cylinders and the parts necessary to coact with them.

In these drawings, A represents a casing which is provided with a detached or separate bottom portion A', and the casing A is provided upon opposite sides with arms $A^2$ by means of which it can be mounted or secured in place.

Upon the casing A are mounted two sets of cylinders C the cylinders of each set being arranged out of the perpendicular at an angle of about thirty-two degrees and the two sets being oppositely arranged. Each cylinder is provided with piston C' and is surrounded by a water jacket $C^2$ and is also provided with an exhaust nozzle $C^3$ and each water jacket is provided with a drain pipe $C^4$ and a supply pipe $C^5$.

Passing longitudinally through the casing A is a driving or power shaft B, provided in the case of a four cylinder engine with two cranked portions, each of which has a wrist pin B'. A fluid vapor pipe D supplies each of the four cylinders by means of four branch pipes D'. These fluid vapor inlet pipes D' open into a chamber $D^2$ formed upon one side of the cylinder proper and this chamber opens into an igniting chamber $D^3$ formed at the upper ends of the cylinders and communicating with the clearance space. A suitable igniting or firing pin $D^4$ ignites the vapor passed into the chambers $D^3$. Communication between the chambers $D^2$ and $D^3$ is controlled by a suitable check valve E which coöperates with a suitable valve seat formed between said chambers.

To the piston C' of one set of cylinders C are pivotally connected pitman rods F, and to the pistons C' of the other set of cylinders are pivotally connected pitman rods F', which are slotted at their lower ends as shown at $F^2$ and a pitman F is pivotally connected to each of the wrist pins B' within the bifurcation $F^2$ of one of the rods F', so that to each wrist pin B' are pivoted two pitmen of one of the sets of cylinders C.

It will be obvious therefore that as the cylinders C are arranged in oppositely disposed sets the same holds true of the pistons. To distinguish more clearly between these sets the piston rods of one set are designated by the reference letter F and of the other set by the reference letter F', the construction being the same. The wrist pins B' are also disposed at angles of ninety degrees apart and the various pistons will therefore occupy at any given time different positions in their various cylinders.

As shown in Fig. 5 as one of the pistons is upon the point of commencing a stroke upwardly, in a cylinder of one set, a piston of an oppositely arranged cylinder, that is, in the other set, has made one fourth of the stroke, the adjacent piston C' has made one-half of a stroke and the piston C' in the remaining cylinder of the last mentioned set, has completed a stroke, and it will be also observed from said diagram that as a piston to which is connected a pitman rod F is ending its stroke, a second piston to which is connected a piston rod F and which therefore belongs to the same set of cylinders, has only made one-fourth of a stroke, while a piston C' to which a rod F' is connected is commencing a stroke and a remaining piston also connected to a rod F'' has completed one-half of its stroke.

To regulate the admission of vapor from the pipes D' into the igniting chambers D³, the following mechanism is employed:—A shaft G is arranged above and parallel to the shaft B and there is mounted upon this shaft a gear wheel G² which meshes with a gear wheel G' carried by the shaft B, the gear wheel G² being twice the size of the gear wheel G' and making one revolution to two revolutions of the gear wheel G'. The shaft G carries two eccentrics H, which are provided with an eccentric strap H' and a block H², the block H² forming the upper half of the strap. A suitable casting J is formed upon the casing A between the two sets of cylinders and in this casting which is suitably cut out are arranged a plurality of guide sleeves J' one for each valve E and within the sleeves J' are loosely placed close coil springs J² which are connected at their upper ends to the valve stems J³ and at their lower ends to links J⁵ which are pivotally connected to ends of the blocks H². In Figs. 6 and 7 I have shown the details of construction of these parts and it will be noted that the spring J² has a plug J⁶ threaded into its upper end and into this plug is threaded the lower end of the valve stem J³, a suitable nut being used to lock the same in place. A bifurcated plug J⁷ is threaded into the lower end of the spring J² and in the bifurcation of the plug J⁷ is pivoted the upper end of one of the links J⁵. It will be understood that two of the links J⁵ are connected to each of the blocks H² and to opposite ends of the said block, and that they actuate valves E in opposing cylinders. As the eccentric H rotates it will lift the ends of the block H² alternately, and it will also be noted that the sleeves J' are arranged parallel to the cylinders and therefor at an angle to the block H² which is arranged in a horizontal plane and transverse to the shaft G. By reason of this construction the eccentric H will give an upward thrust to the valve E of one of the cylinders and then an upward thrust to the valve E of the opposing cylinder, and as the valve actuating mechanism includes a spring, the valve will be positively opened, by the thrust of the eccentric and positively closed by the block H² aided by the spring, as the tendency of the springs J² are to force the block H² down upon the periphery of the eccentric H.

Having thus fully described my invention, what I claim as new and desire to secure by Letters Patent, is:—

1. The combination with an engine having cylinders arranged in oppositely disposed sets, pistons in said cylinders, a power shaft, piston rods connected to said power shaft, a parallel shaft driven from the power shaft, valve chambers carried by the cylinders, valves in said chambers, eccentrics on the second mentioned shaft, blocks on the eccentrics, straps holding the blocks in place, and means for pivotally connecting two valves of oppositely disposed cylinders to the same block.

2. In a multi-cylinder engine, cylinders arranged in oppositely disposed sets, pistons, piston rods, a common crank shaft, a second shaft, driven from the crank shaft, eccentrics thereon, blocks on the eccentrics, valve casings carried by the cylinders, valves therein, valve stems, springs connected to the valve stems, and links pivotally connecting the springs to the blocks, valves of opposite sets being connected to the same.

3. A valve mechanism for multi-cylinder engines comprising an eccentric, a block fitting thereon, a strap connected to the corners of the block, valves, said valves being carried by the oppositely disposed cylinders, valve stems, closed coiled springs connected to the outer end of the stems and links each pivotally connected at one end to a spring and at the opposite end to one of the remaining corners of the blocks.

GEORGE W. STANLEY.

Witnesses:
W. B. SCHRIER,
THOMAS J. MCELHENY.